PARAMETRIC AMPLIFIER

Filed Sept. 17, 1958

INVENTORS
Robert Adler
Glen Wade
BY Hugh H. Drake
ATTORNEY

United States Patent Office 3,090,925
Patented May 21, 1963

3,090,925

PARAMETRIC AMPLIFIER

Robert Adler, Northfield, Ill., and Glen Wade, Menlo Park, Calif., assignors to Zenith Radio Corporation, a corporation of Delaware Filed Sept. 17, 1958, Ser. No. 761,609
17 Claims. (Cl. 330—4.7)

This invention relates to parametric amplifiers. More particularly it has to do with methods of and apparatus for parametrically amplifying signal motion present in electron beams.

In the copending applications of Robert Adler, Serial Number 738,546, filed May 28, 1958, entitled, Electronic Signal Amplifying Methods and Apparatus and of Glen Wade, Serial Number 747,764, filed July 10, 1958, entitled Parametric Amplifier, both assigned to the same assignee as the present application, there are disclosed a number of signal amplifying devices. Generally speaking, these devices include an electron source from which an electron beam is projected along a predetermined path. Spaced along the beam path are several components including an input modulator responsive to applied signal energy for modulating the beam. Subsequent to modulation, the beam is subjected to the action of a modulation expander after which amplified signal energy is extracted from the expanded beam modulation in an output coupler. The preferred amplifiers disclosed in the Adler application and the amplifiers disclosed in the Wade application are of a kind in which the electron signal motion is parametrically amplified.

A parametric amplifier is a device in which a reactance which is part of a transmission system is varied periodically by an external energy source. The parametric amplifiers disclosed in the aforesaid applications include means for establishing an electron resonant frequency for the electrons passing through the expander and means responsive to a driving signal for developing a field having a restoring force component varying in proper phase with respect to the signal motion to impart energy thereto. Lately there has been intense activity in the art with respect to amplifiers employing these principles. Considerable development effort has been expended on both tranverse-field and longitudinal-field devices in an effort to further improve existing apparatus as well as to discover more about the nature of the devices and to promote the ultimate in utility. The art has not progressed, however, without encountering obstacles which in certain cases have been overcome by careful study and rigorous attention to detail.

One severe obstacle which has been encountered in certain parametric amplifiers has beeen the development of undesired distortion in the amplification process including the generation of harmonics and spurious signals. These highly objectionable characteristics have been particularly troublesome in longitudinal-field amplifiers.

It is accordingly a general object of the present invention to provide a new and improved method of and apparatus for obtaining parametric amplification which overcomes the aforementioned obstacles heretofore existing.

It is another object of the present tinvention to provide new and improved apparatus for and a method of obtaining parametric amplification which is capable of achieving substantial gain while contributing minimum noise and undesirable side effects.

One detailed object of the present invention is to provide a new and improved method of and apparatus for parametrically amplifying motion in a longitudinal-field electron beam amplifier.

In carrying out the invention, an electron beam is projected along a predetermined path and there is developed on the beam a space-charge wave corresponding to input signal energy at a predetermined frequency. A driving signal wave of a frequency different from that of the input signal is generated externally of the beam path and energy from this driving signal wave is delivered to the space-charge wave. The external driving signal wave is propagated with a propagation constant unequal to the propagation constant of any space-charge wave produced on the beam corresponding to the driving signal frequency. Finally, energy is extracted from the beam.

In accordance with a feature of the invention, the energy delivered to the space-charge wave from the driving signal wave generates on the beam an idler space-charge wave. The external driving signal wave is propagated with a propagation constant equal to the sum of the idler space-charge-wave propagation constant and the propagation constant of the input-signal space-charge wave, while the external driving signal wave propagation constant is equal to the propagation constant of any space-charge wave on the beam corresponding to the driving signal frequency. The invention contemplates that any space-charge wave on the beam corresponding to the driving signal frequency has a reduced plasma frequency unequal to the sum of the reduced plasma frequencies of the input-signal and idler space-charge waves so that the propagation constant of any such space-charge wave on the beam corresponding to the driving signal frequency cannot be equal to the propagation constant of the external driving-signal wave.

Apparatus constructed in accordance with the invention includes an input coupler responsive to signal energy at a frequency $\omega_1$ for modulating the beam to develop thereon a space-charge wave having a propagation constant $\beta_1$ and a reduced plasma frequency $\omega_{q1}$. A wave propagation system, having a propagation constant $\beta_{3d}$ for driving signals of a frequency $\omega_3$, is disposed alongside the beam path and is responsive to such driving signals for generating on the beam an idler space-charge wave having a propagation constant $\beta_2$ equal to $B_{3d}-\beta_1$ at a frequency $\omega_2$ equal to $\omega_3-\omega_1$ with a corresponding reduced plasma frequency $\omega_{q2}$ such that any space-charge wave on the beam corresponding to driving signal frequency $\omega_3$ has a reduced plasma frequency $\omega_{q3}$ unequal to $\omega_{q1}+\omega_{q2}$.

One feature of the inventive apparatus is that the wave propagation system responds to driving-signal energy of a frequency different from the input-signal frequency by propagating a wave at a velocity approximately equal to the velocity of a fast space-charge wave developed on the beam in response to the signal-input energy, while the wave propagation system is incapable of propagating signals of the input-signal frequency at a velocity in the vicinity of and at the input-signal space-charge-wave velocity.

The features of the present invention which are believed to be novel are set forth with particularity in the appended claims. The organization and manner of operation of the invention, together with further objects and advantages thereof may best be understood by reference to the following description taken in connection with the accompanying drawings, in the several figures of which like numerals identify like elements, and in which:

Figure 2:
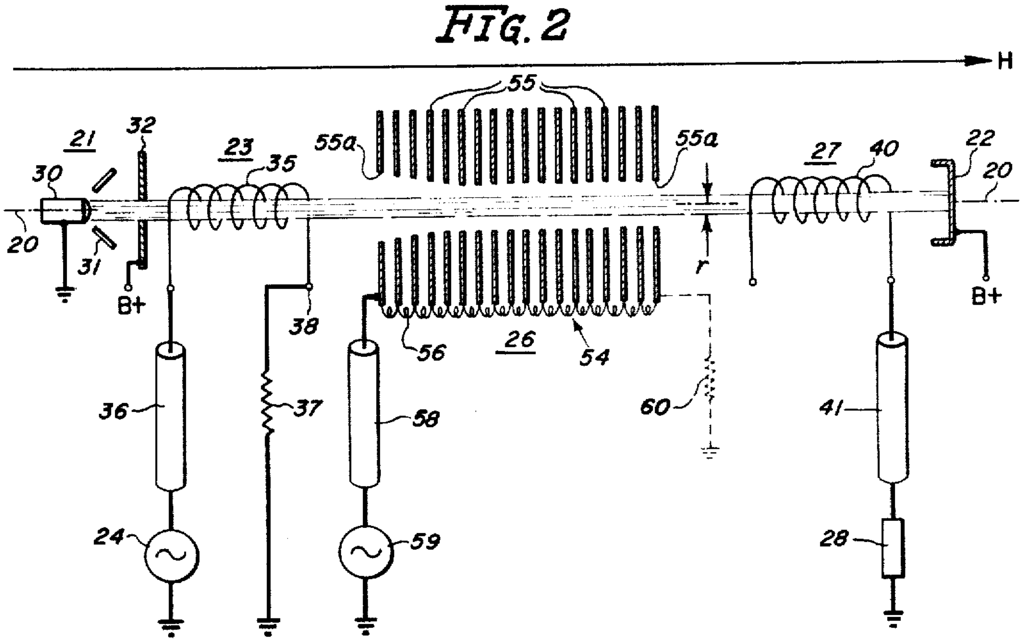
FIGURE 2 is a schematic diagram of one embodiment of the present invention.
Figure 2A:
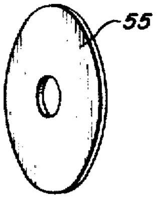
Figure 3:
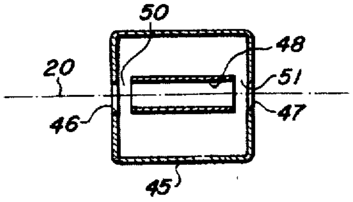

FIGURE 2*a* is a perspective view of an electrode utilized in the apparatus illustrated in FIGURE 2; and FIGURE 3 is a cross-sectional view of a portion of an alternative embodiment of the invention.

Figure 1:
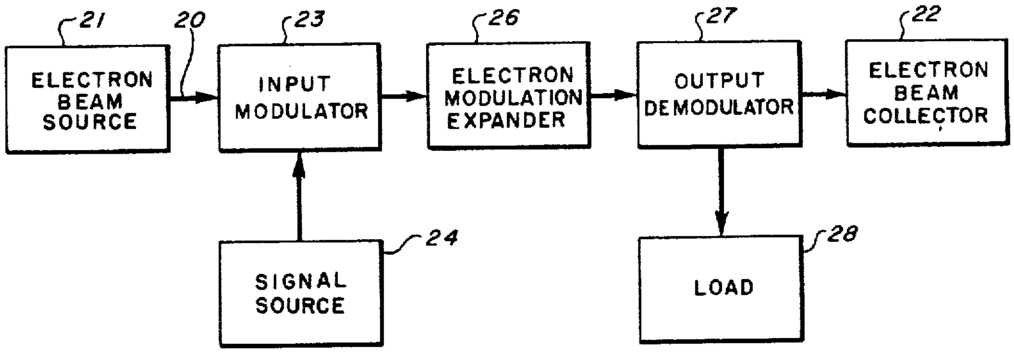
FIGURE 1 is a block diagram of a parametric amplifier.

Generally speaking, a parametric amplifier which utilizes an electron beam includes an electron-signal-motion expander associated with means for modulating with signal energy an electron beam projected along a reference path and means for demodulating the amplified signal motion. As illustrated in FIGURE 1, an electron beam is projected along a reference path 20. The electron-beam source 21 may be entirely conventional and preferably includes the usual cathode together with suitable focusing and accelerating electrodes for developing a well defined beam of electrons. An electron-beam collector 22 may be disposed at the end of the path remote from the electron source and may conventionally include an anode biased at a positive potential with respect to the cathode.

Disposed in a first portion of beam path 20 is an input modulator 23 coupled to a signal source 24. Modulator 23 is an electron coupler capable if imparting energy to the electron beam in response to energy received from signal source 24. The signal intelligence is represented on the beam as electron motion. Within modulator 23 and beyond an electron-resonant frequency is established for this electron motion. In a longitudinal-field device this resonant condition is related to the well-known space-charge waves developed in response to the input signal energy.

Following input modulator 23 and disposed alongside a second portion of beam path 20 beyond the modulator is an electron modulation expander 26. On beyond expander 26 is a demodulator 27 disposed along a third beam path portion and coupled to a suitable load 28. Operation of demodulator 27 is generally the reverse of that of modulator 23. Motion of the electrons in the beam interacts with demodulator 27 to transfer energy from the beam to the demodulator from where it is fed to load 28 by conventional coupling circuitry.

In the present apparatus it is contemplated to remove energy components existing in the beam as it passes through the modulator. Such energy components may constitute excess noise which otherwise would be present in the derived output signal. This noise is carried by the electron beam and appears as energy components which are added to the signal components; typical of such electron beam noise is that originating in the electron source. Additional beam component energy may also be present in the form of other signals applied to the electron beam prior to its passage through modulator 23.

To the end of removing such signal component energy, modulator 23 is constructed to interact with the fast electron wave. It has heretofore been known that interaction between electron beams and circuits placed alongside such beams can take at least two different forms. Two distinct fundamental electron waves exist in an electron beam at a given frequency. One travels faster than the electron stream; the other travels slower.

A simplified interpretation of the electron wave action may be developed by considering the electron beam as subject to a restoring force derived from the space charge in longitudinal-field tubes and the focusing field in transverse-field tubes. This restoring force enables each electron in the beam to oscillate about its normal position in the beam at the previously mentioned electron-resonant frequency, often referred to as the reduced plasma frequency in longitudinal-field tubes and the cyclotron frequency or transverse-resonant frequency in transverse-field tubes.

Motion of the electrons in the beam at the electron-resonant frequency, once excited, persists until disturbed. To excite this motion the velocity of wave propagation on the circuit must be such that the electrons, traveling at a different velocity, "see" a signal field at their own resonant frequency. This will occur for a circuit wave traveling either at the fast electron wave velocity or at the slow electron-wave velocity. Interaction between electron motions and signal fields leads to different results in the two cases. For a circuit wave velocity corresponding to the slow electron wave velocity, phase relations are such that in-phase signals on the beam and the circuit tend to augment each other and produce exponential amplification; this is the mechanism conventionally used in traveling-wave tubes. At the same time, out-of-phase signals on the beam and the circuit tend to suppress each other and produce exponential attenuation.

When the circuit wave velocity corresponds to the fast electron wave velocity, the phase relationships are such that when the signal on the circuit augments the motion of the electron beam that same motion has the effect of reducing the signal on the circuit and vice versa. As a result of this interrelationship, a signal traveling on the circuit will eventually disappear from the circuit and at the same time appear on the beam. Subsequently the signal will reappear on the circuit. Conversely, a signal originating on the beam is transferred to the circuit and, further on, is transferred back to the beam. This is a standing-wave phenomenon analogous to the standing waves observed on coupled transmission lines. However, the interchange mechanism is not limited to the use of transmission lines. It is known to the art that lumped structures may be arranged to interact with the beam in an equivalent manner.

One aspect of this phenomenon of beam-and-circuit signal interchange is the existence of points along the beam where, at a given signal frequency, all of the signal impressed upon the circuit is transferred to the beam as modulation of the specific character of beam interaction employed and all of the energy originally present in the beam as modulation of the same character is transferred to the circuit. This interchange of energy between the beam and the circuit is limited to the specific mode of electron motion which constitutes the faster of the two possible electron waves at the particular signal frequency.

By utilizing fast wave interaction, a desired signal may then be transferred to the beam while noise components are extracted therefrom. In so doing, induced noise is minimized; such noise is induced by the beam in conventional electron beam modulator structures and is then once more impressed upon the beam. A system for interacting with an electron beam in accordance with these principles to absorb noise is described and claimed in Patent 2,832,001 issued April 22, 1958 to Robert Adler for Electron Discharge Systems and assigned to the same assignee as the present invention.

In order then to take advantage of this fast electron-wave noise absorption phenomenon, input modulator 23 is preferably constructed and loaded so that all fast-wave energy components originally on the beam are transferred to the modulator circuit while the energy from signal source 24 is transferred to the beam. As a result, the electron beam leaving modulator 23 and traveling toward modulation expander 26 contains energy corresponding to the signal energy supplied by source 24 while containing but a minimum, if any, other fast-wave energy such as that originally appearing on the beam in the form of noise.

In order to obtain useful gain, the modulation imposed upon the beam in modulator 23 is expanded. That is, expander 26 produces amplification by imparting energy to the electron signal motion. The energy from which gain is derived is supplied by an external source in a form which minimizes the transfer to the beam of noise components present in the external source, at least in the modulation mode to which demodulator 27 preferably is responsive. Within expander 26, like in the modulator and demodulator, the beam electrons are subjected to an electron suspension or restoring-force field; in a longitudinal-field device, this is part of the mechanism which establishes the input-signal space-charge wave. Amplification is achieved by varying the stiffness of the suspension periodically in phase with the electron motion components so as to impart energy to the electron motion. This is achieved by subjecting the electron beam to a time-varying inhomogeneous field during its passage through modulation expander 26. By properly phasing the inhomogeneous field components created in the expander, a periodic time-varying restoring force field component is added to the suspension and imparts increased energy to the electron motion. This basic mechanism is explained in detail in each of the aforesaid two copending applications. Briefly stated, the time variable inhomogeneous field acts upon electrons in the beam by developing a force at a proper time and in a proper direction to give a boost to the signal motion. That is, the beam electrons have a resonant motion and the force derived from the inhomogeneous field component is caused to periodically vary with respect to the periodic electron motion such that it aids the motion of at least a portion of the beam electrons.

The energy for establishing the inhomogeneous field is derived from a separate driving signal source the frequency of which is related to the frequency of the periodic electron motion so that the time variation of the inhomogeneous field is properly phased with respect to that motion. During operation, a component of electron motion is produced at an idler frequency $\omega_2$ which is the difference between the driving signal frequency $\omega_3$ and the input signal frequency $\omega_1$. With the driving signal frequency exactly equal to twice the signal frequency, the difference frequency is equal to the signal frequency. It may be noted that it has been found that useful amplification may be obtained even though the driving signal frequency departs substantially from a value equal to twice the input signal frequency. Of course, variation of the driving signal frequency $\omega_3$ results in a corresponding variation in the idler frequency for a given signal frequency since in any event, $\omega_1+\omega_2$ equal $\omega_3$.

Various beam-interaction devices may be utilized within the modulator, expander and demodulator. Changes may be made in the structure based on relationships between signal frequency, electron-resonant frequency, and phase velocity as is understood in the art. Either lumped structures or transmission line structures may be designed in accordance with well understood principles to correspond with any particular phase velocity of the electron waves. Moreover, when the elimination of noise is of no particular concern in the operation of a longitudinal-field device for example, simple gaps very short in the direction of electron travel may be used for the modulator and demodulator. It is also known to discriminate between the slow and fast wave by using pairs of such gaps spaced in phase with respect to electron motion so that the undesired wave is cancelled. Accordingly, parametric expanders find advantageous use irrespective of the kinds of modulator and demodulator employed. Amplification of electron motion is obtainable with either fast or slow electron-wave interaction. However, the greatest benefit will usually be obtained through the use of fast-wave interaction throughout the tube in order to take fullest advantage of the noise elimination possibilities.

The general discussion thus far presented pertains not only to the apparatus of the present application but also is related to that disclosed and claimed in the aforesaid copending applications. In order to now discuss the features of the present invention, reference should be had to FIGURE 2 which schematically illustrates a preferred embodiment of the present invention and in which there is depicted a longitudinal-field electron-beam amplifier having a parametric modulation expander. As in FIGURE 1, the amplifier includes an electron gun 21 which projects an electron beam along a reference path 20 through a modulator 23, an expander 26 and a demodulator 27 after which the beam is collected by an anode 22 connected to a potential supply source B+ so as to be biased positively with respect to a cathode 30 in electron gun 21. The electron gun may be of any suitable variety and as illustrated is the well-known Pierce gun which includes a focusing electrode 31 and an accelerator 32 following cathode 30.

The electron beam projected through the aperture in accelerator 32 is confined throughout its travel so as to be of substantially uniform thickness. In this instance the radius $r$ of the beam is maintained constant by a magnetic focusing field schematically indicated by the arrow label H. It is known to the art to use other means for confining an electron beam so as to maintain its thickness constant, the use of a magnetic field generally being the most convenient since it may be obtained readily from a solenoid encircling the entire length of the tube and energized with direct current.

Input modulator 23 may be of any of the well-known devices for modulating an electron beam with energy from a signal source. In the present instance the modulator includes a helix 35 through which the beam path extends. Helix 35 is fed from source 24 through a coaxial line 36 connected to the input end of the helix. In the present embodiment the output end of the helix is terminated through an impedance, a terminating resistor 37 being connected between the end of helix 35 opposite the connection to coaxial cable 36 and ground. Resistor 37 normally has a value equal to the characteristic impedance of helix 35.

As discussed more fully above, it is desired in order to obtain the fullest benefits of low noise amplification to interchange noise and signal energy in modulator 23. One method of properly adjusting the modulator or coupler for the desired energy interchange relationship between noise and signal energy when the fast and slow electron wave velocities are well separated is by means of the known Kompfner-dip techniques heretofore used with other apparatus for measuring the characteristics of transmission lines and the like. To apply this technique, a signal is applied from source 24 and a receiver is inserted between terminal 38 and ground, across resistor 37. The beam current and voltage are adjusted so that a null is observed across resistor 37. Under this condition, the beam noise is dissipated in the resistor while the signal level on the helix 35 reaches a null at terminal 38. Thus, all signal energy flows from source 24 into the beam and the fast-wave beam noise is transferred to resistor 37.

Alternatively, by omitting terminating resistor 37 and taking advantage of total reflection of waves in the absence of a termination, the extracted beam noise is returned to the signal source which is matched to helix 35. Beam current and voltage may then be adjusted so that all the fast-wave beam noise is extracted, reflected and dissipated in the signal source.

Also as pointed out above, to achieve the desired energy interchange relationship it is necessary that the coupler be designed to interact with the fast electron wave on the beam. To this end, the helix is constructed to have a propagation velocity $u_f$ in the absence of the electron beam which corresponds to the desired fast electron wave to be generated on the beam in operation.

The demodulator or output coupler may be identical in construction to modulator 23. However, one end of the output coupler need not be terminated though this may be done if desired. Thus, demodulator 27 includes a helix 40 wrapped around the beam, the end toward collector 22 of which is coupled to load 28 through a coaxial line 41. Helix 40 is wound to have a propagation velocity which in operation permits the helix to interact with the signal energy to be extracted.

Helices 35 and 40 are shown merely as examples of one form of suitable coupler. As explained, they preferably are designed for fast electron wave interaction in order to take advantage of the low noise capabilities of the apparatus. It will be obvious to one skilled in the art that other known types of input and output couplers may be employed such as loaded wave guides or cavities. As an example, the double-gap cavity shown in FIGURE 3 is of a type which has heretofore been used in other electron beam apparatus for impressing signal energy upon a beam and which may be also utilized for deriving signal energy from the electron beam. The cavity is simply defined by a box-like housing 45 having openings 46 and 47 in opposite walls through which the electron beam travels along path 20. Within housing 45 and disposed parallel to and along opposite sides of the beam between openings 46 and 47 is a drift tube 48 which terminates short of each of the openings to define a pair of gaps 50 and 51. The coupler is constructed so that the gaps are fed in phase with the signal energy and are spaced to enhance the fast wave while cancelling the slow wave on the beam at the signal frequency.

Expander 26 is also, considered by itself, merely an electron interaction device in the form of a "slow-wave" circuit disposed alongside the electron beam. The term "slow-wave" refers to the well understood description of a circuit having a velocity of wave propagation slower than the speed of light and does not refer to its beam interaction characteristics with respect to distinguishing between fast and slow electron-waves. While an iterative structure is illustrated it will become apparent that other wave propagating structures well known to the art for beam interaction in such devices as traveling wave tubes may be utilized if formed to have the characteristics necessary to the attainment of the present invention. For example, a helix may also be utilized in the expander with its characteristics selected to satisfy the requirements to be presented. The presently illustrated structure includes a plurality of annular electrodes 55 encircling and successively spaced along beam path 21 with the electron beam passing successively through the apertures 55*a* in the electrodes. Each electrode 55 by itself may simply be a metal washer as shown in more detail in FIGURE 2*a*. Electrodes 55 are successively intercoupled by small inductances 56 so as to form a wave propagation line or system 54 having a propagation constant which may be adjusted by means of the value given to each of inductances 56.

The first one of electrodes 55 along the beam path is coupled through a coaxial line 58 to a driving signal generator 59. Energy supplied to the wave propagation system from generator 59 appears on the system as a wave traveling along the line.

Before explaining the present invention in detail, it may be well to recall that, as discussed above, in a longitudinal-field electron beam device the input signal causes the electrons to vibrate back and forth along beam path 20 at a reduced plasma frequency $\omega_{q1}$. The signal modulation appears on the beam as an electron wave, preferably a fast wave, having a propagation velocity $u_1$ with a corresponding propagation constant of $\beta_1$; the propagation constant $\beta_1$ is that of the resulting space-charge wave formed on the beam and may for a fast wave be expressed as follows:

$$\beta_1=\frac{1}{u_e}(\omega_1-\omega_{q1})$$

where $u_e$ is the beam electron velocity and $\omega_1$ is the input signal frequency. The resonant period of the resultant signal modulation is described by the plasma frequency which is a function of the D.C. beam voltage and current density as more fully described in an article by G. M. Branch and T. G. Mihran entitled "Plasma Frequency Reduction Factors in Electron Beams," appearing in volume ED–2, No. 2 of the IRE Transactions on Electron Devices published under date of April 1955. As discussed in detail in that article, the effective or actual plasma frequency on the beam is reduced by various factors including fringing of the longitudinal electric field. The significant parameter as far as beam action itself is concerned is the reduced plasma frequency generally represented as $\omega_q$. In the present instance the space-charge wave developed in response to signal energy from source 24 at a frequency $\omega_1$ has a propagation constant $\beta_1$ and a reduced plasma frequency $\omega_{q1}$.

In accordance with the present invention, the driving-signal wave at frequency $\omega_3$ is generated externally to the beam on wave propagation system 54. Energy from this external driving-signal wave is delivered to the space-charge wave on the beam to generate thereon an idler space-charge wave at a frequency $\omega_2$ equal to $\omega_3-\omega_1$ with a corresponding reduced plasma frequency $\omega_{q2}$ and having a propagation constant $\beta_2$ which may for a fast idler wave be expressed as:

$$\beta_2=\frac{1}{u_e}(\omega_2-\omega_{q2})$$

The invention contemplates that the reduced plasma frequency $\omega_{q3}$ of any space-charge wave produced on the beam corresponding to driving-signal frequency $\omega_3$ is substantially different from the sum of $\omega_{q1}$ and $\omega_{q2}$. Furthermore, the external driving signal wave is propagated with a propagation constant $\beta_{3d}$ equal to $\beta_1+\beta_2$. The propagation constant $\beta_{3d}$ of the external wave accordingly may be expressed as:

$$\beta_{3d}=\frac{1}{u_e}[\omega_3-(\omega_{q1}+\omega_{q2})]$$

While $\beta_{3d}$ is equal to $\beta_1+\beta_2$, it is unequal to the propagation constant $\beta_3$ of any space-charge wave generated on the beam corresponding to the driving-signal frequency. $\beta_3$ may be expressed as:

$$\beta_3=\frac{1}{u_e}(\omega_3-\omega_{q3})$$

In consequence of the application of the principles of the present invention, the presence of any space-charge wave on the beam having propagation constant $\beta_3$ is minimized.

In accordance with a more detailed aspect of the invention, wave propagation system 54 responds to the driving signal, which is of a frequency different from that of the input signal, to propagate a wave at a velocity approximately equal to the velocity of the input-signal space-charge wave on the beam while at the same time system 54 is incapable of propagating signals at the input signal frequency at a velocity in the vicinity of and including the input-signal space-charge-wave-velocity $u_1$. Expressed in terms of propagation constants rather than velocities, system 54 has a propagation constant for the driving signals approximately equal to the product of the input signal wave propagation constant multiplied by the frequency ratio of the driving signal to the input signal with the system 54 further having a propagation constant, at the input signal frequency and with respect to input signal waves propagating in the direction of propagation of the driving signal wave, which is substantially different from the input signal wave propagation constant.

By utilizing a wave propagation system external to the beam but in coupling relation therewith and satisfying the conditions set forth, a driving signal wave is established which meets precisely the requirements for optimum signal amplification in the expander, while the magnitude of any space charge wave corresponding to the driving signal frequency is minimized. In consequence, the amplification process is both efficient and cleanly defined, there being a minimum of undesired interaction productive of distortion by reason of the generation of harmonics and other spurious signals which would otherwise be produced if a space-charge wave of substantial energy corresponding to the driving signal frequency were permitted to exist on the beam, as where a wave of such character is utilized to obtain the entire amplification.

In the present apparatus the invention is embodied by assigning to wave propagation system 54 a propagation velocity $u_{3d}$ for signals at the driving frequency $\omega_3$ which satisfies the expression:

$$u_{3d}=\frac{u_0}{1-\frac{\omega_{q1}+\omega_{q2}}{\omega_3}}$$

It may even be made slightly greater than that to minimize undesired interaction with a space-charge wave at the driving frequency. At the same time, wave propagation system 54 has a propagation velocity for signals at the input frequency $\omega_1$ which is substantially different from the propagation velocity of the input signal space-charge wave on the beam to avoid the development on system 54 of a wave derived from the input-signal modulation capable of interacting with the desired beam wave.

While the relationships of the invention may be obtained in various ways, it is contemplated to enforce the desired conditions by making the beam comparatively thick. The word "thick" is understood in the art to establish a beam characteristic which serves to contrast with the "thin" beam often employed especially in longitudinal-field traveling-wave devices. A figure of quality may be established which sets forth the relationship between the circumference of the beam $2\pi r$ and the electronic wave length $$\frac{u_e}{f_1}$$

corresponding to the input signal on the beam, $f_1$ being the input signal frequency and $r$ being the beam radius. The ratio of the beam circumference to this electronic wave-length yields the figure of quality:

$$\frac{2\pi r}{\frac{u_e}{f_1}}$$

which equals $$\frac{\omega_1}{u_e} r$$

and which is conveniently expressed as $\beta_{e1}r$, where $\beta_{e1}$ is the electronic wave number corresponding to the frequency $\omega_1$.

In general, the beam may be considered "thick" when the figure of quality in consistent units exceeds approximately one-half. Other than circular beams may of course be employed and an equivalent figure of quality utilized. For example, with a sheet-like beam, the half-thickness instead of the radius of the beam is specified, the radius merely being the half-thickness of a generally round beam. A large figure of quality $\beta_{e1}r$ results in an increase of the difference between $\omega_{q3}$, on one hand, and the sum $\omega_{q1}+\omega_{q2}$, on the other; with the illustrative apparatus, $\omega_{q3}$ is less than $\omega_{q1}+\omega_{q2}$. Thus, a thicker beam brings about a greater separation between the propagation constant $\beta_3$ of the undesired space-charge wave on the beam at frequency $\omega_3$ and the propagation constant $\beta_{3d}$ of the externally applied driving-signal wave.

It will be recognized that frequency selective beam-interaction devices are well known per se and the invention may be practiced by utilizing for expander 26 any such system to propagate the driving signal wave with a propagation constant $\beta_{3d}$ as defined and provide coupling between that wave and the input-signal space-charge wave. The art well understands the design of such apparatus to meet a given set of conditions and particularly to assign a selected propagation constant for a given frequency. The invention in its broader aspects therefore lies not in the particular construction of any of the individual parts but rather in their interrelationship and especially in the creation of a newly disclosed relationship between the various propagation constants. Electron beam apparatus constructed in accordance with the inventive principles is capable of producing gain of the order of tens of db with noise figures of less than one db.

In accordance with the principles of the present invention, the beam electrons passing through expander 26 are subjected to a substantially pure time-variable inhomogeneous field developed along the beam path and which in a manner analogous to the transverse-field apparatus discussed in detail in the aforementioned copending applications develops forces on the electrons having a phase with respect to the signal motion to yield energy thereto and boost that motion. At the same time, application of the inventive principles enables minimization of unwanted side effects which otherwise would yield undesired distortion.

The process which takes place under the influence of the driving signal wave can be described as follows. In a free space-charge wave, the electrons move back and forth at their resonant frequency, the reduced plasma frequency. The inertial forces caused by the electron mass are balanced by the electric field produced by the space-charge wave. In order to achieve a similar balance at a frequency above resonance, it is necessary to add an electric field which produces forces acting on the electrons in phase with the forces produced by this space-charge field. This added field is contributed by the driving signal wave. The total driving field is a summation of the field produced by the forced space-charge motion and that acting directly from wave system 54. Thus, there is a naturally produced space-charge field on the beam which aids in the parametric amplification process and as a result, for the same gain, less externally applied field is required; on the other hand, this space-charge wave, which is capable of producing adverse effects, is of substantially less intensity for a given amount of gain as compared with a device in which the entire parametric amplification process is the result of a driving space-charge wave produced and developed on the beam as opposed to a wave of external fields being produced and developed on an external structure.

Another factor which contributes to insuring that the dominant mode of parametric expansion is one involving a pure time-variable inhomogeneous field derived from wave propagation system 54 lies in the ability of the present structure to apply the driving field everywhere with the right phase velocity for amplification. Moreover, the use of thick beams with a short space-charge wavelength permits substantial gain since gain is proportional to the number of such wavelengths, permitting a reduction of the required pumping field and consequently the amount of beam modulation for a given amount of gain. In addition, by using a propagation velocity along wave propagation system 54 slightly higher than the theoretically exact value, it appears that maximum gain for a given set of conditions is obtainable with minimum distortion.

In accordance with a subsidiary feature of the invention, expander 26 is preferably constructed in a manner such that the electron beam is subjected to a time-variable inhomogeneous field of gradually increasing intensity in order to avoid development of transient waves. Were the beam to be suddenly subjected to the full field in the expander, a free space-charge wave on the beam would be generated with a propagation constant $\beta_3$ and with an amplitude equal to the relatively weak forced space-charge wave unavoidably generated by the driving signal field and having a propagation constant $\beta_{3d}$. These two space-charge waves would then alternately add and cancel, thus producing regions of double beam modulation. This is undesirable. By applying the driving field gradually, the build-up of the free space-charge wave on the beam is prevented or substantially reduced. To this end, an initial portion of the annular electrodes have an inner-diameter greater than that of the remainder. In the specific structure illustrated, the inner-diameter of electrodes 55 becomes successively smaller over an initial portion of the system and then remains generally constant over the remainder. It may be noted that in the practical embodiment illustrated, there are three of electrodes 55 per driving-frequency wavelength.

It is not critical whether the expander is terminated since any reflected waves are in general unharmful. Without a termination, the expander requires only a very small amount of driving signal energy. In this condition, the driving-signal wave on the expander is a standing wave. When it is necessary for best overall results in a particular expander structure to properly terminate the expander in accordance with conventional practices, a suitable resistor 60 may be placed between ground and the end of the wave propagation system remote from the point to which coaxial line 58 is connected; there will be a consequent increase in required driving signal energy because of dissipation in the termination impedance. In this instance, as in the case of the resistor 37 used to terminate the input coupler helix 35, it should be understood that other known techniques for terminating wave propagating structures, such as resistance means adjacent to and distributed over several turns or structure elements, may be used in place of lumped resistors.

For optimum noise reduction, input coupler 23 should remove noise from signals at both frequencies $\omega_1$ and $\omega_2$. This is generally practicable if these two frequencies are not too far apart. If, on the other hand, they are far apart and if a single coupler cannot be made to remove the noise at both frequencies, then the invention contemplates the use of two modulators 23 arranged one behind the other with one at each of the signal and idler frequencies, as described and claimed in the aforesaid copending Adler application. Either one of these may also be used for applying the desired signal to the beam.

There has been described apparatus specifically designed for achieving parametric signal motion expansion in a longitudinal-field electron beam device. It has been explained that for the most part the individual elements illustrated are well known and are but examples of a large variety of suitable electron interaction devices known to the art, per se. Apparatus constructed in accordance with the invention is designed to incorporate the principles of parametric electron beam amplifiers while at the same time minimizing distortion in the amplifying process characteristic of the operation of heretofore known longitudinal-field parametric amplifiers. The forces acting directly upon the beam electrons to amplify their motion are in apparatus of the present invention derived from a field generated by a wave propagated along a structure adjacent the beam. The fundamental conditions necessary for parametric amplification are satisfied while at the same time other conditions are met which afford decidedly improved operation.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. Apparatus for parametrically amplifying signal energy which comprises: means for projecting an electron beam along a predetermined path; means for developing on said beam a space-charge wave corresponding to input-signal energy at a predetermined frequency; means for propagating a driving-signal wave externally of and alongside said beam path at a frequency different from said predetermined frequency and having a propagation constant for said driving-signal wave to deliver energy from said driving-signal wave to said space-charge wave with said propagation constant being substantially different from the propagation constant of any space-charge wave produced on the beam corresponding to said driving-signal frequency; and means for extracting amplified signal energy from said beam.

2. Apparatus for parametrically amplifying signal energy which comprises: means for projecting an electron beam along a predetermined path; means for developing on said beam a fast space-charge wave corresponding to input signal energy at a predetermined frequency while removing fast-wave noise components from said beam; means for propagating a driving signal wave externally of and alongside said beam path at a frequency different from said predetermined frequency and having a propagation constant for said driving-signal wave to deliver energy from said driving-signal wave to said fast space-charge wave with said propagation constant being substantially different from the propagation constant of any space-charge wave on the beam corresponding to said driving signal frequency; and means for extracting amplified fast-wave signal energy from said beam.

3. Apparatus for parametrically amplifying signal energy which comprises: means for projecting an electron beam along a predetermined path; means for developing on said beam a space-charge wave corresponding to signal energy at a predetermined frequency and having a propagation constant $\beta_1$; means for generating a driving-signal wave externally of said beam path at a frequency different from said predetermined frequency and delivering energy from said driving-signal wave to said space-charge wave to generate on said beam an idler space-charge wave having a propagation constant $\beta_2$ while propagating said external driving-signal wave alongside said path with a propagation constant $\beta_{3d}$ efual to $\beta_1+\beta_2$ but unequal to the propagation constant of any space-charge wave on the beam corresponding to said driving-signal frequency; and means for extracting amplified signal energy from said beam.

4. Apparatus for parametrically amplifying signal energy which comprises: means for projecting an electron beam along a predetermined path; means for developing on said beam a space-charge wave corresponding to signal energy at frequency $\omega_1$ and having a propagation constant $\beta_1$; means for generating a driving-signal wave externally of said beam path at a frequency $\omega_3$ different from $\omega_1$ and delivering energy from said driving-signal wave to said space-charge wave to generate on said beam an idler space-charge wave at a frequency $\omega_2$ equal to $\omega_3-\omega_1$ and having a propagation constant $\beta_2$ while propagating said external driving-signal wave alongside said path with a propagation constant $\beta_{3d}$ equal to $\beta_1+\beta_2$ but unequal to the propagation constant of any space-charge wave on the beam corresponding to said driving-signal frequency; and means for extracting amplified signal energy from said beam.

5. Apparatus for parametrically amplifying signal energy which comprises: means for projecting an electron beam along a predetermined path; means for developing on said beam a space-charge wave having a propagation constant $\beta_1$ and a reduced plasma frequency $\omega_{q1}$ corresponding to signal energy at a frequency $\omega_1$; means for generating a driving signal wave externally of said beam path at a frequency $\omega_3$ and delivering energy from said driving-signal wave to said space-charge wave to generate on said beam an idler space-charge wave at a frequency $\omega_2$ equal to $\omega_3-\omega_1$ with a corresponding reduced plasma frequency $\omega_{q2}$ and having a propagation constant $\beta_2$ while propagating said external driving-signal wave alongside said path with a propagation constant $\beta_{3d}$ equal to $\beta_1+\beta_2$, any space-charge wave on the beam corresponding to the driving-signal frequency having a reduced plasma frequency smaller than the sum $\omega_{q1}+\omega_{q2}$ so that the propagation constant of any such space-charge wave cannot be equal to $\beta_{3d}$; and means for extracting amplified signal energy from said beam.

6. An amplifier comprising: an electron gun for projecting an electron beam along a predetermined path; an input coupler disposed along a first path portion and responsive to signal energy at a frequency $\omega_1$ for modulating said beam to develop thereon a space-charge wave having a propagation constant $\beta_1$ and a reduced plasma frequency $\omega_{q1}$; a wave-propagation system, having a propagation constant $\beta_{3d}$ for driving-signals of a frequency $\omega_3$, disposed alongside a second path portion beyond said first portion and responsive to such driving-signals for generating on said beam an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving signal frequency $\omega_3$ has a reduced plasma frequency $\omega_{q3}$ unequal to $\omega_{q1}+\omega_{q2}$; and an output coupler disposed along a third path portion beyond said second portion for extracting energy from said beam.

7. An amplifier comprising: an electron gun for projecting an electron beam along a predetermined path; an input coupler disposed along a first path portion and responsive to signal energy at a frequency $\omega_1$ for modulating said beam to develop thereon a fast space-charge wave having a propagation constant $\beta_1$ and a reduced plasma frequency $\omega_{q1}$; a wave-propagation system, having a propagation constant $\beta_{3d}$ for driving-signals of a frequency $\omega_3$, disposed alongside a second path portion beyond said first portion and responsive to such driving-signals for generating on said beam an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving-signal frequency $\omega_3$ has a reduced plasma frequency $\omega_{q3}$ less than $\omega_{q1}+\omega_{q2}$; and an output coupler disposed along a third path portion beyond said second portion for extracting fast-wave energy from said beam.

8. An amplifier comprising: an electron gun for projecting an electron beam along a predetermined path; an input coupler disposed along a first path portion and responsive to signal energy at a frequency $\omega_1$ for modulating said beam to develop thereon a space-charge wave having a propagation constant $\beta_1$ and a reduced plasma frequency $\omega_{q1}$; a plurality of annular electrodes encircling and spaced along a second path portion beyond said first portion with said electrodes successively intercoupled to form a wave-propagation system having a propagation constant $\beta_{3d}$ for driving signals of a frequency $\omega_3$ and responsive to such driving-signals for generating on said beam an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving-signal frequency $\omega_3$ has a reduced plasma frequency $\omega_{q3}$ less than $\omega_{q1}+\omega_{qd2}$; and an output coupler disposed along a third path portion beyond said second portion for extracting energy from said beam.

9. An amplifier comprising: an electron gun for projecting an electron beam along a predetermined path; an input coupler disposed along a first path portion and responsive to signal energy at a frequency $\omega_1$ for modulating said beam to develop thereon a space-charge wave having a propagation constant $\beta_1$ and a reduced plasma frequency $\omega_{q1}$; a plurality of annular electrodes encircling and spaced along a second path portion beyond said first portion with said electrodes being successively intercoupled to form a wave-propagation system having a propagation constant $\beta_{3d}$ for driving-signals of a frequency $\omega_3$ and responsive to such driving-signals for generating on said beam an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving-signal frequency $\omega_3$ has a reduced plasma frequency $\omega_{q3}$ less than $\omega_{q1}+\omega_{q2}$, an initial portion of said annular electrodes having an inner diameter greater than that of the remainder; and an output coupler disposed along a third path portion beyond said second portion for extracting energy from said beam.

10. An amplifier comprising: an electron gun for projecting an electron beam along a predetermined path; an input coupler disposed along a first path portion and responsive to signal energy at a frequency $\omega_1$ for modulating said beam to develop thereon a space-charge wave having a propagation constant $\beta_1$ and a reduced plasma frequency $\omega_{q1}$; a plurality of annular electrodes encircling and spaced along a second path portion beyond said first portion with said electrodes being successively intercoupled to form a wave-propagation system, having a propagation constant $\beta_{3d}$ for driving-signals of a frequency $\omega_3$ and responsive to such driving-signals for generating on said beam and an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving-signal frequency $\omega_3$ has a reduced plasma frequency $\omega_{q3}$ less than $\omega_{q1}+\omega_{q2}$, the inner diameter of said electrodes becoming successively smaller over an initial portion of said system and remaining generally constant over the remainder; and an output coupler disposed along a third path portion beyond said second portion for extracting energy from said beam.

11. An amplifier comprising: an electron gun for projecting an electron beam along a predetermined path; an input coupler disposed along a first path portion and responsive to signal energy at a frequency $\omega_1$ for modulating said beam to develop thereon a space-charge wave having a propagation constant $\beta_1$ and a reduced plasma frequency $\omega_{q1}$; a wave-propagation system, having a propagation constant $\beta_{3d}$ for driving-signals of a frequency $\omega_3$ and comprising a plurality of successively intercoupled electrodes along a second path portion beyond said first portion, responsive to such driving-signals for generating on said beam an idler space-charge wave having a propagation constant $\beta_2$ equal to $\beta_{3d}-\beta_1$ at a frequency $\omega_2$ equal to $\omega_3-\omega_1$ with a corresponding reduced plasma frequency $\omega_{q2}$ such that any space-charge wave on the beam corresponding to driving-signal frequency $\omega_3$ has a reduced plasma frequency $\omega_{q3}$ less than $\omega_{q1}+\omega_{q2}$, there being three of said electrodes per wavelength at said driving-signal frequency $\omega_3$; and an output coupler disposed along a third path portion beyond said second portion for extracting energy from said beam.

12. An amplifier comprising: an electron gun for projecting an electron beam along a predetermined path; an input coupler disposed along a first path portion and responsive to input signal energy at a predetermined frequency for modulating said beam to develop thereon a fast space-charge wave having a predetermined finite propagation constant; a wave propagation system disposed alongside a second path portion beyond said first portion and responsive to driving signal energy of a frequency different from said predetermined frequency for propagating a wave in a direction parallel to said beam path, said system having a propagation constant for said driving signals approximately equal to the product of said predetermined propagation constant multiplied by the frequency ratio of said driving signal to said input signal and having a propagation constant, for signals of said predetermined frequency propagating in said direction; substantially different from said predetermined propagation constant while being incapable of propagating signals in said direction of said predetermined frequency at a velocity in the vicinity of and at said predetermined velocity; and an output coupler disposed along a third path portion beyond said second portion of extracting fast-wave energy from said beam.

13. An amplifier comprising: an electron gun for projecting an electron beam along a predetermined path; an input coupler disposed along a first path portion and responsive to input signal energy at a predetermined frequency for modulating said beam to develop thereon a space-charge wave having a predetermined finite propagation constant; a wave propagation system disposed alongside a second path portion beyond said first portion and responsive to driving signal energy of a frequency different from said predetermined frequency for propagating a wave in a direction parallel to said beam path, said system having a propagation constant for said driving signals approximately equal to the product of said predetermined propagation constant multiplied by the frequency ratio of said driving signal to said input signal and having a propagation constant, for signals of said predetermined frequency propagating in said direction, substantially different from said predetermined propagation constant in the vicinity of and at said predetermined velocity; and an output coupler disposed along a third path portion beyond said second portion for extracting energy from said beam.

14. An amplifier comprising: an electron gun for projecting an electron beam along a predetermined path; an input coupler disposed along a first path portion and responsive to input signal energy at a predetermined frequency for modulating said beam to develop thereon a fast space-charge wave having a predetermined finite propagation constant; a wave propagation system comprising a plurality of successively intercoupled electrodes encircling and spaced along a second path portion beyond said first portion and responsive to driving signal energy of a frequency different from said predetermined frequency for propagating a wave in a direction parallel to said beam path, said system having a propagation constant for said driving signals approximately equal to the product of said predetermined propagation constant multiplied by the frequency ratio of said driving signal to said input signal and having a propagation constant, for signals of said predetermined frequency propagating in said direction, substantially different from said predetermined propagation constant while being incapable of propagating signals in said direction of said predetermined frequency at a velocity in the vicinity of and at said predetermined velocity; and an output coupler disposed along a third path portion beyond said second portion for extracting energy from said beam.

15. An amplifier comprising: an electron gun system for projecting along a predetermined path an electron beam of a predetermined half-thickness; an input coupler disposed along a first path portion and responsive to signal energy at a predetermined frequency for modulating said beam to develop thereon a fast space-charge wave having a predetermined electronic wave number such that the numerical product of said wave number and said half-thickness in consistent units exceeds a value of approximately one-half, said wave-number being the quotient of the angular signal frequency divided by the velocity of electron travel; a wave-propagation system disposed alongside a second path portion beyond said first portion and responsive to driving signal energy at a frequency different from said predetermined frequency for subjecting said beam to a time-variable inhomogeneous longitudinal field over a portion of said path; and an output coupler disposed along a third path portion beyond said second portion for extracting fast-wave energy from said beam.

16. An amplifier comprising: an electron gun system for projecting along a predetermined path an electron beam of a predetermined half-thickness; an input coupler disposed along a first path portion and responsive to signal energy at a predetermined frequency for modulating said beam to develop thereon a space-charge wave having a predetermined electronic wave number such that the numerical product of said wave number and said half-thickness in consistent units exceeds a value of approximately one-half, said wave-number being the quotient of the angular signal frequency divided by the velocity of electron travel; a wave-propagation system disposed alongside a second path portion beyond said first portion and responsive to driving signal energy at a frequency different from said predetermined frequency for subjecting said beam to a time-variable inhomogeneous longitudinal field over a length of said path at least several space-charge-wavelengths long at said predetermined frequency; and an output coupler disposed along a third path portion beyond said second portion for extracting energy from said beam.

17. An amplifier comprising: an electron gun system for projecting along a predetermined path an electron beam of a predetermined radius; an input coupler disposed along a first path portion and responsive to signal energy at a predetermined frequency for modulating said beam to develop thereon a space-charge wave having a predetermined electronic wave number such that the numerical product of said wave number and said radius in consistent units exceeds a value of approximately one-half, said wave-number being the quotient of the angular signal frequency divided by the velocity of electron travel; a wave-propagation system disposed alongside a second path portion beyond said first portion and responsive to driving signal energy at a frequency different from said predetermined frequency for subjecting said beam to a time-variable inhomogeneous longitudinal field over a portion of said path; and an output coupler disposed along a third path portion beyond said second portion for extracting energy from said beam.

References Cited in the file of this patent

UNITED STATES PATENTS

| | | |
|---|---|---|
| 2,245,670 | Hollmann | June 17, 1941 |
| 2,584,308 | Tiley | Feb. 5, 1952 |
| 2,616,990 | Knol et al. | Nov. 4, 1952 |
| 2,860,280 | McArthur | Nov. 11, 1958 |
| 2,972,081 | Bridges et al. | Feb. 14, 1961 |
| 2,974,252 | Quate | Mar. 7, 1961 |
| 3,009,078 | Ashkin | Nov. 14, 1961 |

OTHER REFERENCES

Article by R. Adler, Proc. I.R.E. for June 1958, No. 6, vol. 6, pages 1300–1301.

Article by W. H. Louisell and C. F. Quate, "Parametric Amplification of Space Charge Waves," Proc. I.R.E. for April 1958, pages 707 to 716.

UNITED STATES PATENT OFFICE

CERTIFICATE OF CORRECTION

Patent No. 3,090,925 May 21, 1963

Robert Adler et al.

It is hereby certified that error appears in the above numbered patent requiring correction and that the said Letters Patent should read as corrected below.

Column 2, line 19, for "equal" read -- unequal --; column 3, line 14, for "if" read -- of --; column 5, line 30, for "equal" read -- equals --; column 6, line 3, for "label" read -- labeled --; column 12, line 21, for "efual" read -- equal --; column 13, line 42, for "$\omega_{q1}+\omega_{qd2}$" read -- $\omega_{q1}+\omega_{q2}$ --; column 14, line 4, strike out "and"; line 53, strike out the semi-colon and insert instead a comma; lines 54 to 57, strike out "while being incapable of propagating signals in said direction of said predetermined frequency at a velocity in the vicinity of and at said predetermined velocity"; same column 14, line 58, for "of" read -- for --; column 15, lines 3 and 4, strike out "in the vicinity of and at said predetermined velocity"; lines 26 to 29, strike out "while being incapable of propagating signals in said direction of said predetermined frequency at a velocity in the vicinity of and at said predetermined velocity".

Signed and sealed this 10th day of December 1963.

(SEAL)
Attest:

ERNEST W. SWIDER

Attesting Officer

EDWIN L. REYNOLDS
Acting Commissioner of Patents